US010843561B2

(12) United States Patent
Legl et al.

(10) Patent No.: US 10,843,561 B2
(45) Date of Patent: Nov. 24, 2020

(54) ACTUATOR ASSEMBLY FOR A DRIVE TRAIN OF A MOTOR VEHICLE (71) Applicant: Magna Powertrain GmbH & Co KG, Lannach (AT)

(72) Inventors: Lukas Legl, Graz (AT); Wolfgang Schweiger, St. Stefan (AT)

(73) Assignee: Magna Powertrain GmbH & Co KG, Lannach (AT)

( * ) Notice: Subject to any disclaimer, the term of this patent is extended or adjusted under 35 U.S.C. 154(b) by 175 days.

(21) Appl. No.: 16/081,072

(22) PCT Filed: Mar. 1, 2017

(86) PCT No.: PCT/EP2017/054705
§ 371 (c)(1),
(2) Date: Aug. 30, 2018

(87) PCT Pub. No.: WO2017/153214
PCT Pub. Date: Sep. 14, 2017

(65) Prior Publication Data
US 2019/0061520 A1 Feb. 28, 2019

(30) Foreign Application Priority Data

Mar. 8, 2016 (DE) .......................... 10 2016 203 707

(51) Int. Cl.
*B60K 17/344* (2006.01)
*B60K 17/346* (2006.01)
(Continued)

(52) U.S. Cl.
CPC ........ *B60K 17/3462* (2013.01); *B60K 17/344* (2013.01); *F16D 11/10* (2013.01); *B60K 2023/0858* (2013.01)

(58) Field of Classification Search
CPC .............. B60K 17/344; B60K 17/3462; B60K 2023/0858; F16D 11/10; F16D 2011/006
See application file for complete search history.

(56) References Cited

U.S. PATENT DOCUMENTS 4,782,721 A * 11/1988 Dick .................... B60K 17/344
180/247
5,564,518 A * 10/1996 Ishii ..................... B60K 17/043
180/242

(Continued)

FOREIGN PATENT DOCUMENTS

DE 102011077748 A1 12/2012
DE 102011085839 A1 5/2013
(Continued)

OTHER PUBLICATIONS

International Search Report and Written Opinion dated Jun. 21, 2017 from corresponding International Patent Application No. PCT/EP2017/054705 with English translation of International Search Report.

*Primary Examiner* — Huan Le
(74) *Attorney, Agent, or Firm* — Dickinson Wright PLLC (57) ABSTRACT An actuator arrangement for a drive train including a shifting element moveable between first and second shifting positions, a shifting mechanism operable in a first shifting operation to actuate the shifting element, and a holding mechanism operable to hold to shifting element in both of the first and second shifting positions. The shifting mechanism includes an axially displaceable pushing element. The holding mechanism has a latching element fixed to the shifting element and a latching contour formed on a first shaft element. The latching element is configured to engage the latching contour when the shifting element is located in (Continued)

the second shifting position. The latching element is released from the latching contour via a second shifting operation by the pushing element.

20 Claims, 10 Drawing Sheets

(51) Int. Cl.
  *F16D 11/10* (2006.01)
  *B60K 23/08* (2006.01)

(56) References Cited

U.S. PATENT DOCUMENTS

2002/0153220 A1   10/2002   Dick
2016/0040724 A1*  2/2016    Ebihara ................... B60T 1/062
                                                        74/11

FOREIGN PATENT DOCUMENTS

DE   102012221065 A1   5/2014
DE   102014209809 A1   5/2015

* cited by examiner

Fig. 9

ACTUATOR ASSEMBLY FOR A DRIVE TRAIN OF A MOTOR VEHICLE

CROSS-REFERENCE TO RELATED APPLICATIONS

This application is a National Stage of International Patent Application No. PCT/EP2017/054705, filed Mar. 1, 2017, which claims the benefit and priority of German Patent Application No. DE 10 2016 203 707.2 filed Mar. 8, 2016. The entire disclosures of each of the above applications are incorporated herein by reference.

TECHNICAL FIELD

The present invention relates to an actuator arrangement for a drive train of a motor vehicle.

BACKGROUND

In the field of automotive technology, actuator arrangements in very different structural embodiments serve in a motor vehicle drive train for the selective activation of a driving coupling of a first shaft element to a second shaft element. Actuator arrangements of the generic type are used, in particular, in all wheel drive motor vehicles and in motor vehicles with hybrid drive train architectures. In the field of application of all wheel drive motor vehicles, a reliable disconnection of the part regions of the drive train and needs-based and highly dynamic switching in of the respective part regions of the drive train without a high requirement of electric auxiliary energy are desired; in particular, the maintaining of a respective operating state is preferably to be realized without any supply of energy. Furthermore, it is desirable if a large number of components of an actuator arrangement do not roll or slide on one another in any operating state, in order to avoid friction losses in this way.

Document DE 10 2011 077 748 A1 describes, for example, a connecting apparatus for outside a change speed transmission. The connecting apparatus has a slider sleeve which is arranged fixedly on a vehicle shaft so as to rotate with it and such that it can be displaced axially between at least a first and a second position, the slider sleeve bringing about rotational decoupling of the vehicle shaft from a vehicle drive train element in the first position and bringing about their rotational coupling in the second position. In addition, the connecting apparatus has actuating means for the displacement of the slider sleeve between the first position and the second position, having a shifting groove along the circumference of the slider sleeve and engaging means for engagement into the shifting groove. In one preferred development of the connecting apparatus, the engaging means can be brought switchably into and out of engagement with the respective associated shifting groove. Here, the engaging means can be retracted and/or extended with regard to the shifting groove, for example, by means of an electric motor or electromagnetically. Here, different actuating principles can also be applied for retracting and for extending; for example, the extending can take place mechanically via spring means/spring force accumulator and the retraction can take place electromagnetically, or vice versa. If the retracting or extending takes place via spring means, that is to say by way of relaxing of the spring means, there is preferably a holding apparatus which holds the engaging means without the expenditure of energy in that position, in which the spring means are stressed. For example, the holding apparatus is configured as a ball catch apparatus.

Document DE 10 2011 085 839 A1 describes, for example, a clutch apparatus having two clutch parts which can be coupled by means of a slider sleeve, namely a first clutch part and a second clutch part which are coupled to one another in a positively locking manner via the slider sleeve in the engaged state. The slider sleeve is attached on the first clutch part fixedly so as to rotate with it and in an axially displaceable manner. On its circumferential face, the slider sleeve has at least one first step which has a first step flank and extends with a first step profile on the circumferential face of the slider sleeve. The first step profile also has an axial directional component in the direction of the rotational axis of the first clutch part. An actuating means which can be displaced to and fro between an actuating means coupling position and an actuating means decoupling position bears against the first step flank of the slider sleeve in its actuating means decoupling position during the decoupling operation of the two clutch parts, with the result that the slider sleeve moves axially away from the second clutch part into a sleeve decoupling position during a rotation of the first clutch part. Furthermore, the slider sleeve is supported by means of an axially acting spring, with the result that a spring force holds the slider sleeve in a sleeve coupling position which couples the first and the second clutch part mechanically to one another, or pushes it into said sleeve coupling position if the actuating means is situated in its actuating means coupling position. In the case of the described embodiment of the coupling apparatus, the slider sleeve is held in the decoupling position via the actuating means in its actuating means decoupling position, which results in an increased expenditure of energy.

Document DE 10 2014 209 809 A1 discloses a clutch for a motor vehicle, preferably for switching a drive train for all wheel drive vehicles on and off, comprising a first shaft, a second shaft arranged coaxially with respect to the first shaft, a coupling sleeve which can be displaced in the axial direction relative to the first shaft and to the second shaft and brings about positively locking coupling or decoupling of the first shaft and the second shaft, and a coil which can be loaded with current, it being possible for the coupling sleeve to be displaced in the axial direction by way of loading of the coil with current. In one preferred embodiment, the coupling sleeve has a slotted guide track at least in sections on its outer circumference, it being possible for a nut angle segment to engage into the slotted guide track, which nut angle segment can be actuated by way of the coil which is loaded with current. The nut angle segment is preferably connected permanently to a lever and can be brought into engagement with the slotted guide of the coupling sleeve via the lever.

SUMMARY

It is an object of the invention to specify an alternative actuator arrangement for the optional actuation of a coupling of a first shaft element to a second shaft element, which alternative actuator arrangement operates with a simple construction with a minimum use of electric auxiliary energy and with minimum friction losses.

The object is achieved by way of an actuator arrangement for a drive train of a motor vehicle comprising an axially movable shifting element, it being possible for the shifting element to be moved optionally into a first shifting position and a second shifting position, a first shaft element and a second shaft element being drive-connected in the first shifting position of the shifting element, and the first shaft element and the second shaft element not being drive-connected in the second shifting position of the shifting element, a shifting mechanism, it being possible for a first shifting operation of the shifting element, namely an axial movement of the shifting element from the first shifting position into the second shifting position, and a second shifting operation of the shifting element, namely an axial movement of the shifting element from the second shifting position into the first shifting position, to be actuated via the shifting mechanism, and a holding mechanism, the shifting element being held mechanically both in the first shifting position and in the second shifting position via the holding mechanism, the shifting mechanism having an axially displaceable pushing element, and the holding mechanism having at least one latching element which is arranged fixedly on the shifting element and a latching contour which is arranged fixedly on the first shaft element, the latching element latching into the latching contour in the second shifting position of the shifting element, and it being possible for the latching element to be released from the latching contour upon actuation of the second shifting operation by means of the pushing element.

According to the invention, the actuator arrangement comprises a shifting element, a shifting mechanism and a holding mechanism.

In accordance with the present invention, the shifting element can be moved axially and can be moved optionally into a first shifting position and a second shifting position.

A first shaft element and a second shaft element can be drive-connected by means of the shifting element.

According to the invention, the first shaft element and the second shaft element are drive-connected in the first shifting position of the shifting element, and the first shaft element and the second shaft element are not drive-connected in the second shifting position of the shifting element.

The term "axial" describes a direction along or parallel to the longitudinal axis of the first shaft element.

The term "radial" describes a perpendicular direction with respect to the longitudinal axis of the first shaft element.

According to the invention, the shifting mechanism of the actuator arrangement is configured in such a way that a first shifting operation of the shifting element, namely an axial movement of the shifting element from the first shifting position into the second shifting position, and a second shifting operation of the shifting element, namely an axial movement of the shifting element from the second shifting position into the first shifting position, can be actuated via the shifting mechanism. In accordance with the present actuator arrangement according to the invention, the shifting mechanism has an axially displaceable pushing element.

The holding mechanism according to the invention is configured in such a way that the shifting element is held mechanically in the first shifting position and in the second shifting position without a requirement for electric auxiliary energy. In accordance with the present invention, the holding mechanism has at least one latching element which is arranged fixedly on the shifting element, and a latching contour which is arranged fixedly on the first shaft element, the latching element latching into the latching contour in the second shifting position of the shifting element.

According to the invention, furthermore, the pushing element of the shifting mechanism and the latching element of the holding mechanism are configured in such a way that the latching element can be released from the latching contour by means of the pushing element in the case of actuation of the second shifting operation.

The configuration according to the invention of the actuator arrangement ensures efficient, reduced-energy and reliable operation.

Friction losses and a requirement for electric auxiliary energy occurs only during the first shifting operation and during the second shifting operation. When the drive connection between the first shaft element and the second shaft element is established via the actuator arrangement, no further energy consumption occurs.

Developments of the invention are specified in the dependent claims, the description and the appended drawings.

The shifting mechanism preferably has a housing and an electromagnetic actuator, the electromagnetic actuator being arranged fixedly on the housing, and it being possible for the pushing element to be moved axially relative to the housing by means of the electromagnetic actuator.

The electromagnetic actuator serves for the axial displacement of the pushing element of the shifting mechanism. As a result of the configuration according to the invention of the actuator arrangement, permanent energization of the electromagnetic actuator is not necessary in the first shifting position of the shifting element and/or the second shifting position of the shifting element, which results in particularly energy-efficient operation of the actuator arrangement.

Different design variants of electromagnetic actuators are conceivable, such as a single solenoid or a plurality of solenoids which are distributed around the circumference of the pushing element, or a toroidal coil magnet which acts uniformly on the entire circumference of the pushing element.

The electromagnetic actuator serves for the actuation of the shifting mechanism and of the holding mechanism.

Furthermore, the shifting mechanism preferably has a shifting lever, it being possible for the shifting lever to be moved about a rotational axis by means of a third elastic element in such a way that it is in engagement with a shifting guide plate which is configured on the outer circumferential face of the shifting element and can be brought out of engagement with the shifting guide plate on the outer circumference of the shifting element by means of the pushing element counter to the force of the third elastic element.

The shifting guide plate is configured at least in sections on the outer circumferential face of the shifting element. The term "shifting guide plate" can be understood to mean every geometric configuration which permits an axial movement of the shifting element in the case of an engagement of the shifting lever.

The shifting guide plate is, for example, of thread-like configuration on the outer circumferential face of the shifting element and preferably has different pitches over its course.

The movement sequence and/or the speed profile of the shifting element can be influenced via the configuration of the shifting guide plate on the outer circumferential face of the shifting element.

The pushing element preferably has a locking mechanism, the locking mechanism being configured in a cylindrical receiving opening of the pushing element and having a pressure pin, an intermediate part, a plug-in sleeve, a pin with a toothed segment, and a compression spring. The intermediate part can be assigned to the pressure pin.

The locking mechanism can preferably be actuated by way of the axial movement of the pushing element relative to the housing of the shifting mechanism.

The actuator arrangement according to the invention can be installed, for example, on a lateral shaft between an axle drive and a wheel of a motor vehicle.

DRAWINGS

In the following text, the invention will be described by way of example with reference to the drawings, in which.

DESCRIPTION

Figure 1:
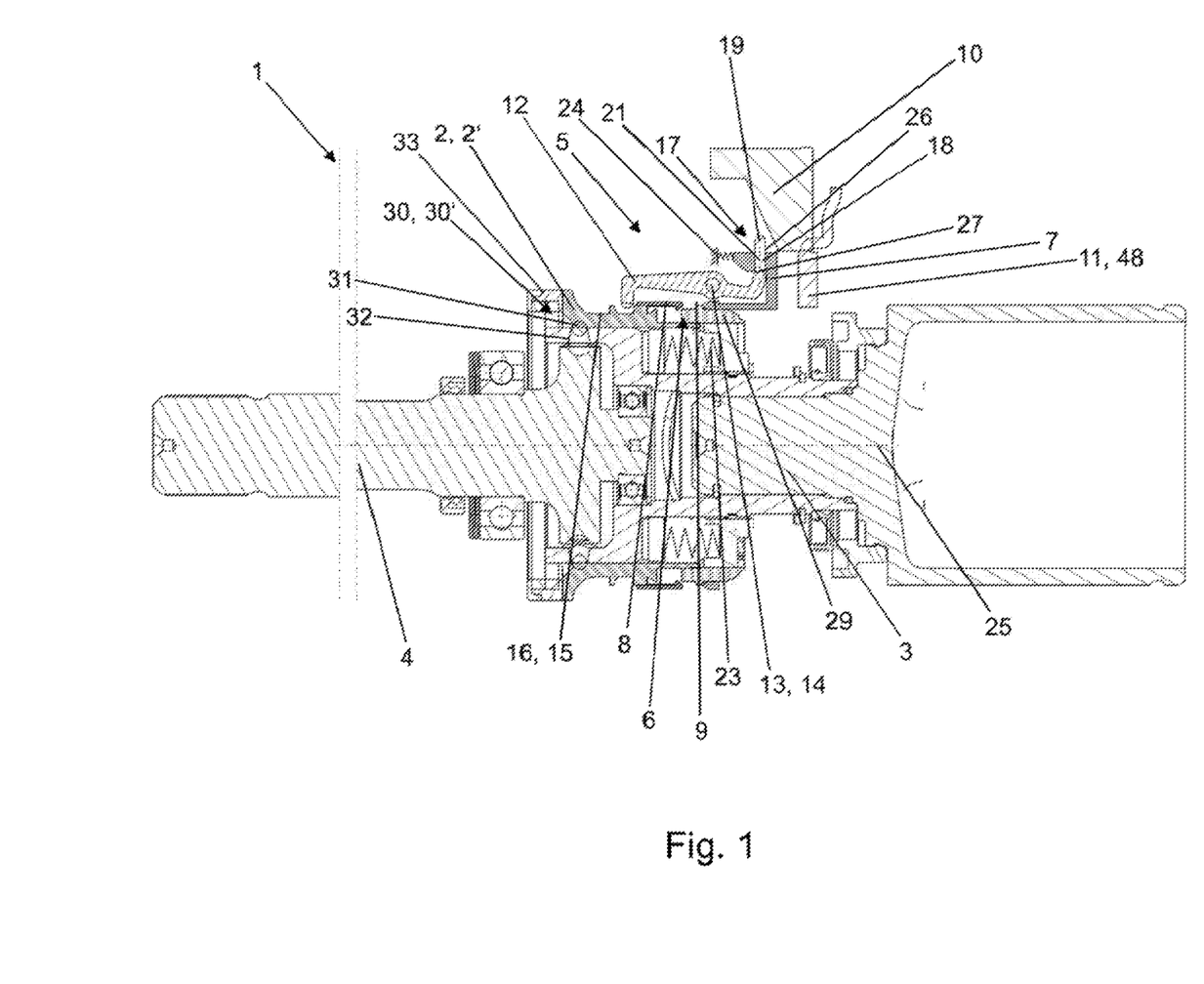
FIG. 1 shows a sectional view of an exemplary actuator arrangement in a first shifting position of a shifting element.
Figure 2:
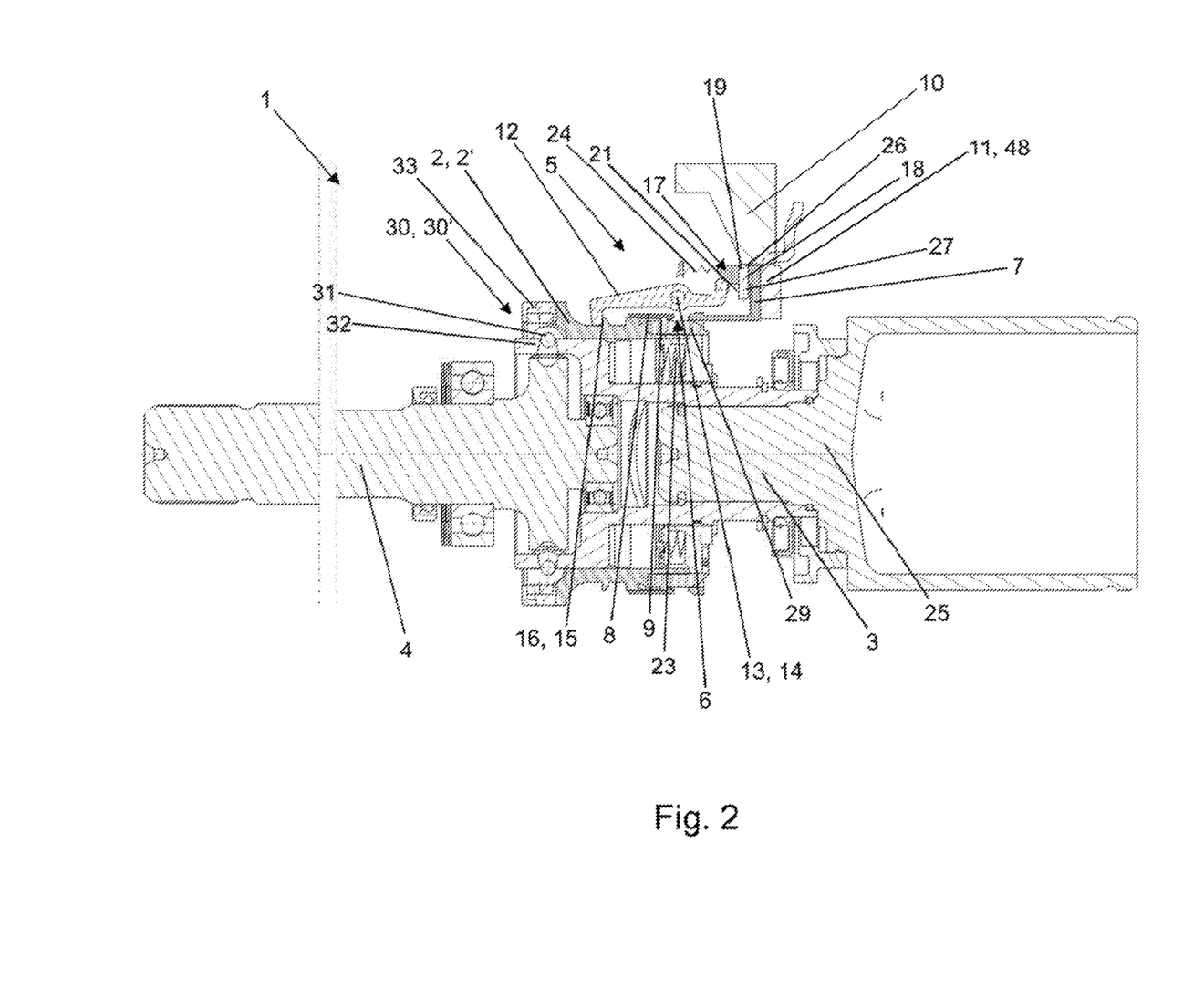
FIG. 2 shows a sectional view of an exemplary actuator arrangement during a first shifting operation.
Figure 3:
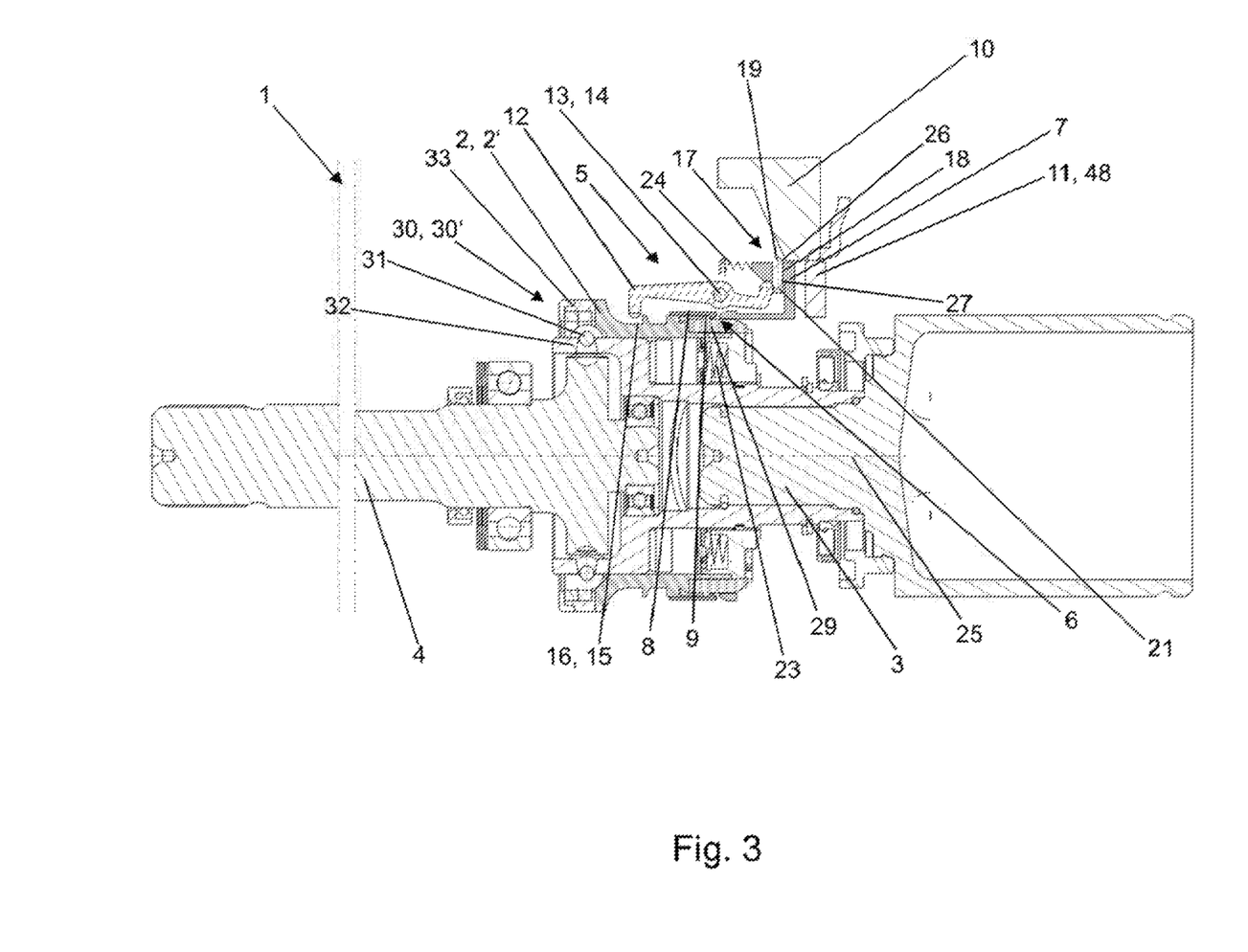
FIG. 3 shows a sectional view of an exemplary actuator arrangement in a second shifting position of a shifting element.
Figure 4:
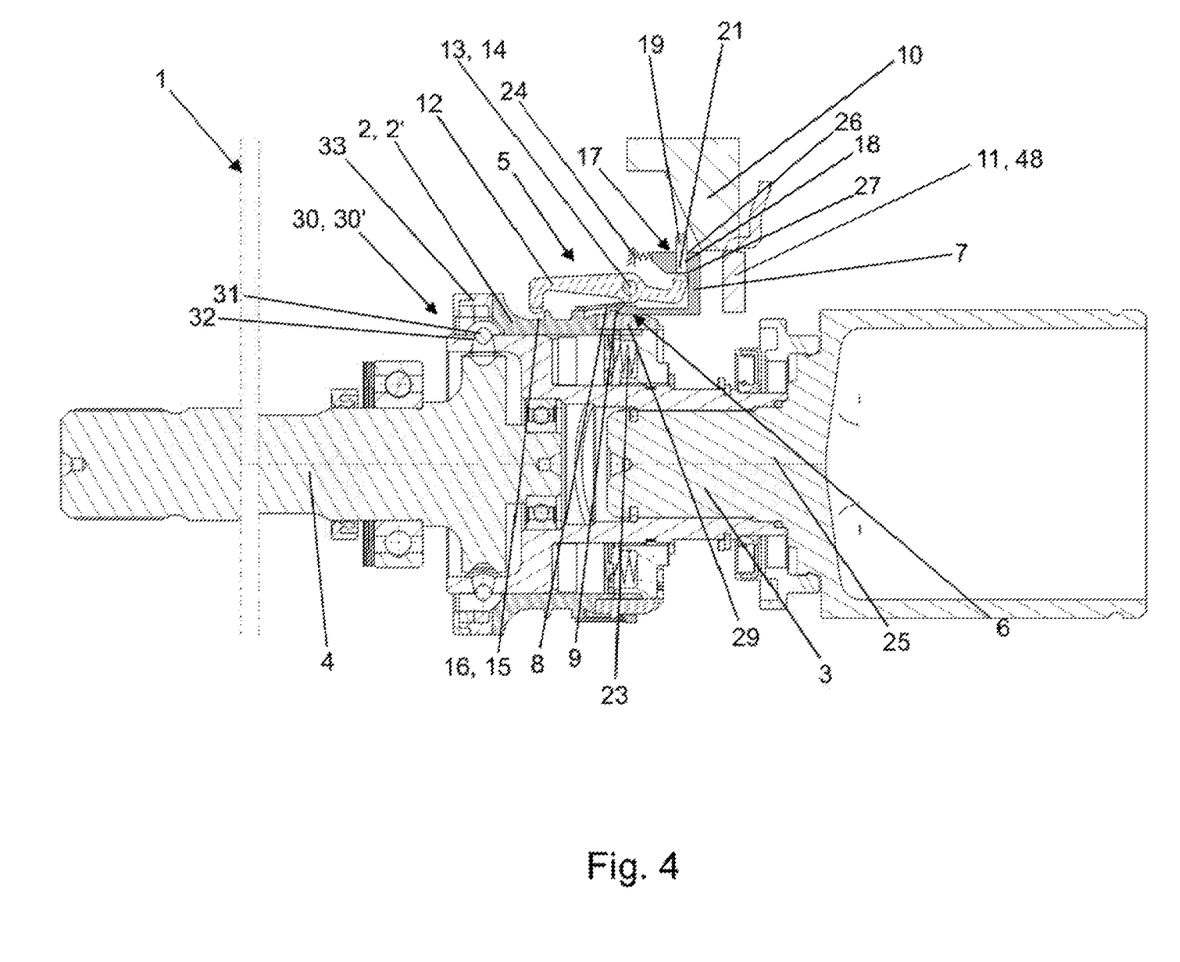
FIG. 4 shows a sectional view of an exemplary actuator arrangement during a second shifting operation.

FIG. 1 to FIG. 4 show an exemplary actuator arrangement 1 according to the invention in different shifting positions of a shifting element 2, namely in a first shifting position of the shifting element 2 and a second shifting position of the shifting element 2 (FIG. 1 and FIG. 3), and during the different shifting operations, namely a first shifting operation and a second shifting operation (FIG. 2 and FIG. 4).

The actuator arrangement 1 has the shifting element 2, a shifting mechanism 5 and a holding mechanism 6.

The shifting element 2 is configured as a selector sleeve 2' and is arranged on a first shaft element 3 fixedly so as to rotate with it and in an axially movable manner. A second shaft element 4 is arranged coaxially with respect to the first shaft element 3.

The term "axial" describes a direction along or parallel to a longitudinal axis 25 of the first shaft element 3.

The optional coupling of the first shaft element 3 to the second shaft element 4 can be actuated via the actuator arrangement 1. The first shaft element 3 and the second shaft element 4 are arranged coaxially with respect to one another and, as shown in FIG. 1 to FIG. 4, can be connected via a positively locking coupling mechanism 30, a "flyball" mechanism 30' here. In the first shifting position of the shifting element 2, 2', the shifting element 2, 2' presses spherical connecting elements 31 of the "flyball" mechanism 30' into corresponding connecting element receptacles 32, in order in this way to ensure the transmission of torque from the first shaft element 3 to the second shaft element 4 or vice versa.

FIG. 1 shows the selector sleeve 2' in a first shifting position, namely a shifting position in which the first shaft element 3 is drive-connected to the second shaft element.

FIG. 3 shows the selector sleeve 2' in a second shifting position, namely a shifting position in which the first shaft element 3 is not drive-connected to the second shaft element 4.

The shifting mechanism 5 has a housing 10, an electromagnetic actuator 11 which is arranged fixedly on the housing 10, a pushing element 7 with a locking mechanism 17, and a shifting lever 12.

The electromagnetic actuator 11 has a coil 48, namely an electromagnet coil, and an armature (not shown) which can be moved in the axial direction, the armature being connected fixedly to the pushing element 7.

The pushing element 7 has a substantially U-shaped cross section, the open side of the U-shape pointing in the direction of the shifting lever 12, and the closed side of the U-shape pointing in the direction of the electromagnetic actuator 11. Furthermore, the pushing element 7 is configured as a cylindrical sleeve or as an angle segment of a cylindrical sleeve.

The pushing element 7 can be moved axially by means of the electromagnetic actuator 11 and is mounted in the housing 10.

The locking mechanism 17 is shown in FIG. 6 to FIG. 9. The locking mechanism 17 is configured in a receiving opening 18 of the pushing element 7. The receiving opening 18 is configured on that side of the pushing element 7 which faces the housing 10, and has a first outlet opening 26 and a second outlet opening 27, the first outlet opening 26 being configured radially on the outside and the second outlet opening 27 being configured radially on the inside. A conclusion about the respective shifting state of the system can be made via the reactive electromagnetic action of force in the electromagnetic actuator 11 which is dependent on the position of the armature of the electromagnetic actuator 11.

The term "radial" describes a perpendicular direction with respect to the longitudinal axis 25 of the first shaft element 3.

The term "radially on the inside" describes a radial position which lies closer to the longitudinal axis 25 in relation to the longitudinal axis 25 of the first shaft element 3 than a radial position which lies "radially on the outside".

The locking mechanism 17 is configured in the manner of a "retractable ballpoint pen mechanism". To this end, the locking mechanism 17 has a pressure pin 19, an intermediate part 20, a plug-in sleeve 34, a pin 21 with a toothed segment 35, and a compression spring 22.

Figure 6:
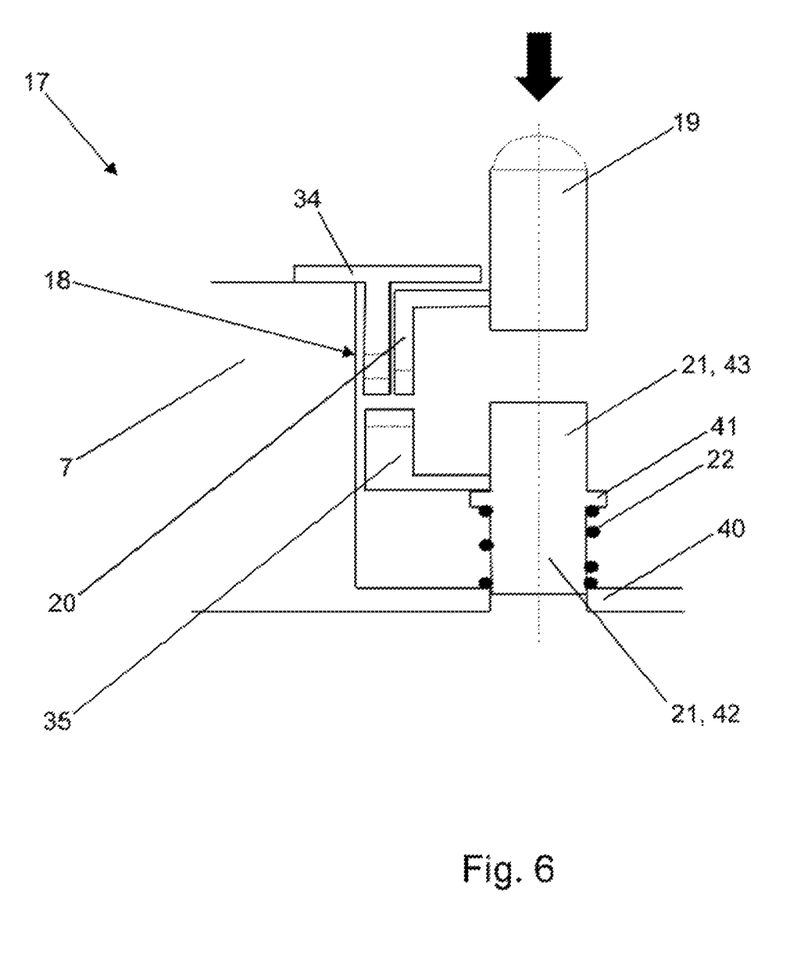
FIG. 6 shows a diagrammatic detailed illustration of a locking mechanism, FIG. 7 diagrammatically shows a developed illustration of the essential components of a locking mechanism in a first locking position, FIG. 8 diagrammatically shows a developed illustration of the essential components of a locking mechanism in the case of a transition from the first locking position into the second locking position, FIG. 9 diagrammatically shows a developed illustration of the essential components of a locking mechanism in a second locking position.
Figure 7:
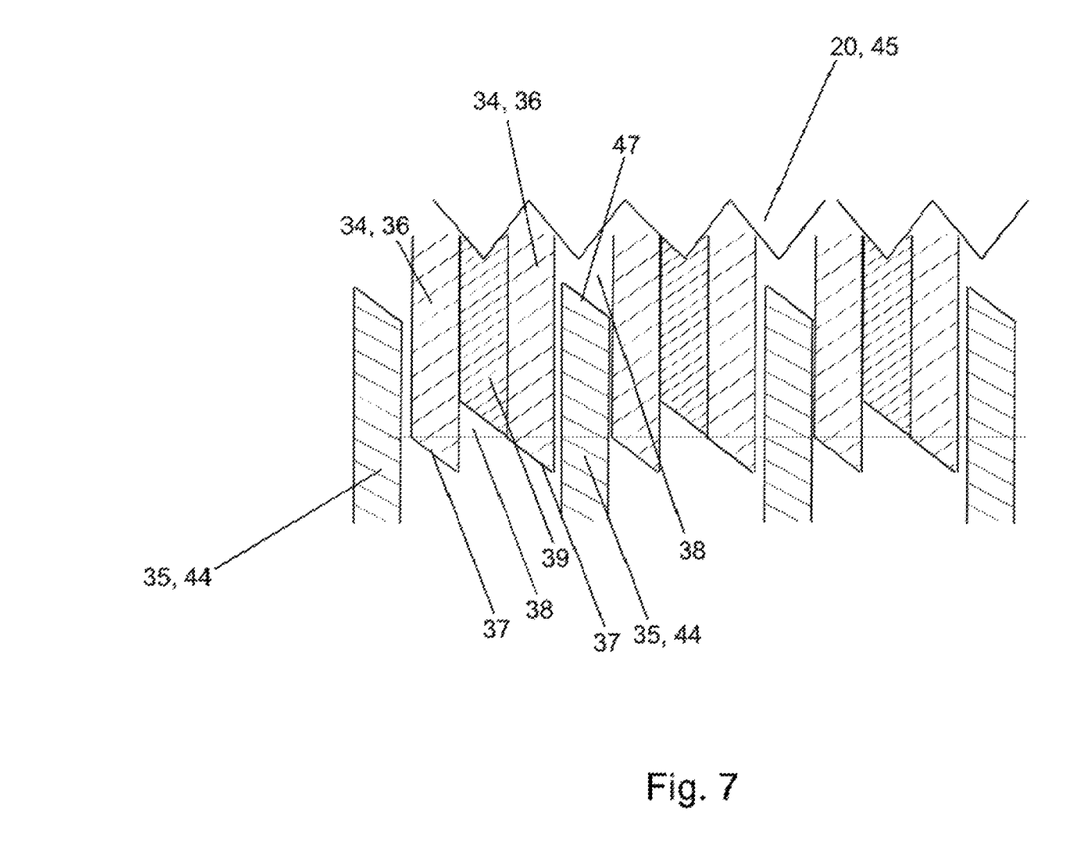

The receiving opening 18 of the pushing element 7 is of substantially cylindrical configuration. The plug-in sleeve 34 is arranged in the receiving opening 18 of the pushing element 7. In a manner which is distributed uniformly on its circumference, the plug-in sleeve 34 has a plurality of radially extending first elevations 36, the first elevations 36 having first chamfers 37 at their radially inner ends (FIG. 7). Intermediate spaces 38 are configured in each case between the first elevations 36, every second intermediate space 38 being of partially closed configuration by means of in each case one second elevation 39. The second elevations 39 are likewise shaped obliquely at their radially inner ends, like the first elevations 36. The compression spring 22 of the locking mechanism 17 is arranged in the receiving opening 18 in the radially innermost region (FIG. 6).

The pin 21 is of substantially cylindrical configuration. The pin 21 has a first section 42 and a second section 43. The first section 42 of the pin 21 and the second section 43 of the pin 21 result substantially from the arrangement of a second stop 41 on the pin 21.

The compression spring 22 of the locking mechanism 17 is arranged in the region of the first section 42 of the pin 21, and is supported on a first stop 40 in the receiving opening 18 and the second stop 41 on the pin 21. The compression spring 22 of the locking mechanism 17 prestresses the pin 21 into a first locking position.

A toothed segment 35 is arranged at the radially outer end of the pin 21 in the region of the receiving opening 18.

The toothed segment 35 is connected fixedly to the pin 21 in the region of the second section 43 of the pin 21 on the outer circumferential face of the pin 21, and is of substantially cylindrical configuration. The toothed segment 35 has a plurality of third elevations 44 in a manner which is distributed uniformly on its outer circumference. In comparison with the third elevations 44 of the toothed segment 35, the plug-in sleeve 34 has twice as many first elevations 36 and the same number of second elevations 39. The third elevations 44 of the toothed segment 35 are configured in such a way that they fit into the intermediate spaces 38 between the first elevations 36 of the plug-in sleeve 34; the third elevations 44 are configured in such a way that they fit at least partially into the intermediate spaces 38 with the second elevations 39 of the plug-in sleeve 34 and completely into the other intermediate spaces 38. Second chamfers 47 are configured at the radially outer ends of the third elevations 44.

The pressure pin 19 is arranged at least partially in the receiving opening 18 at the radially outer end of the intermediate part 20; the radially outer end of the pressure pin 19 is guided out of the first outlet opening 26 of the receiving opening 18 (FIG. 6). On its end face which lies radially on the inside in relation to the longitudinal axis 25, the intermediate part 20 has a radially oriented toothing system 45 circumferentially. The pressure pin 19 is configured in such a way that it presses the intermediate part 20 and, via the toothed segment 35, the pin 21 radially to the inside counter to the force of the compression spring 22 in the case of the exertion of a radially inwardly directed force at its radially outer end; the pressure pin 19, the intermediate part 20, the toothed segment 35 and the pin 21 experience a movement radially to the inside counter to the force of the compression spring 22. Here, a rotational movement of the toothed segment 35 including the pin 21 occurs on account of the interaction of the toothing system 45 of the intermediate part 20 with the second chamfers 47 of the toothed segment 35. The rotational movement is a movement of the third elevations 44 out of a respective intermediate space 38 into the respectively circumferentially next intermediate space 38. Here, the pin 21 moves through the second outlet opening 27 of the receiving opening 18 into the first locking position or a second locking position.

The first locking position (FIG. 7) corresponds to a position, in which the third elevations 44 of the toothed segment 35 are displaced in each case into intermediate spaces 38 without second elevations 39 and are received completely there; the pin 21 is received completely in the receiving opening 18.

The second locking position (FIG. 9) corresponds to a position, in which the third elevations 44 of the toothed segment 35 are displaced in each case into intermediate spaces 38 with second elevations 39 and are received only partially there; the pin 21 is guided at least partially through the second outlet opening 27 of the receiving opening in the region of the second section 21.

Figure 5:
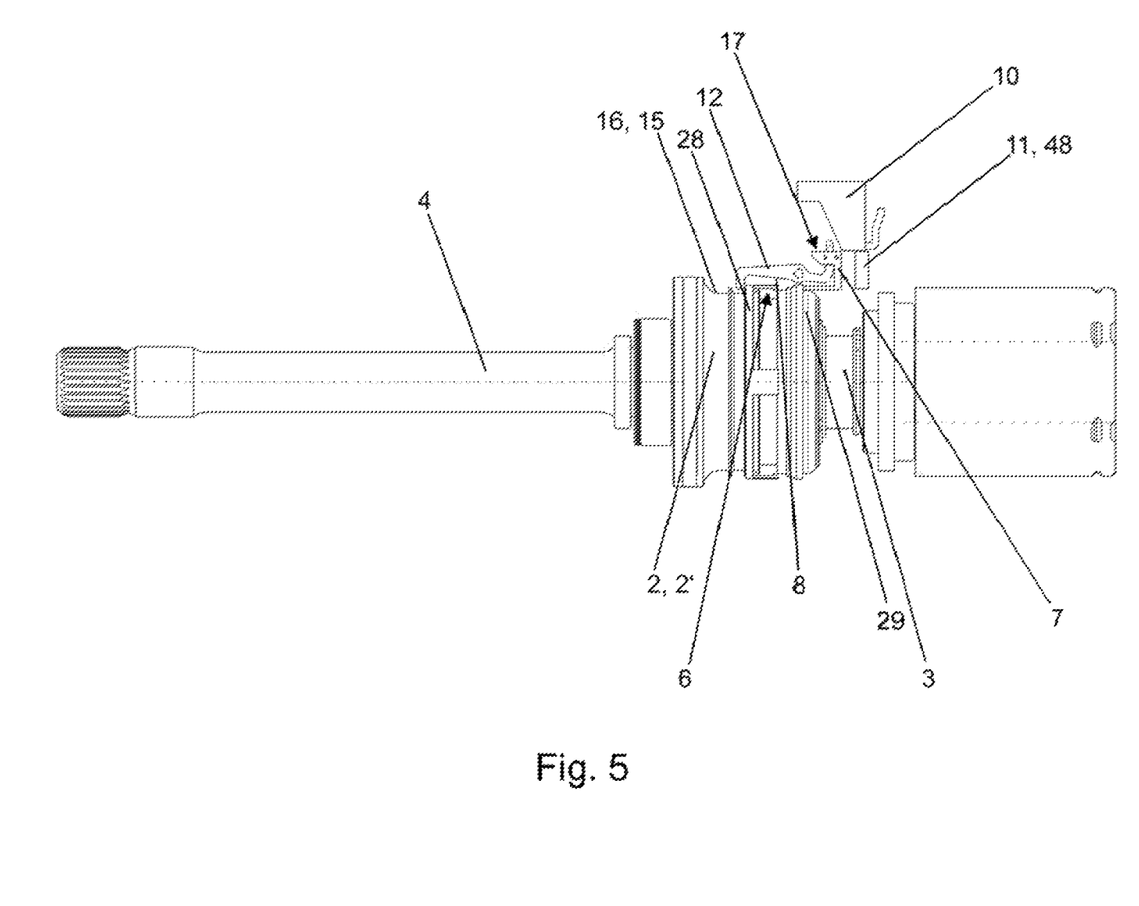
FIG. 5 shows an illustration of an exemplary actuator arrangement in accordance with FIG. 1.
Figure 10:
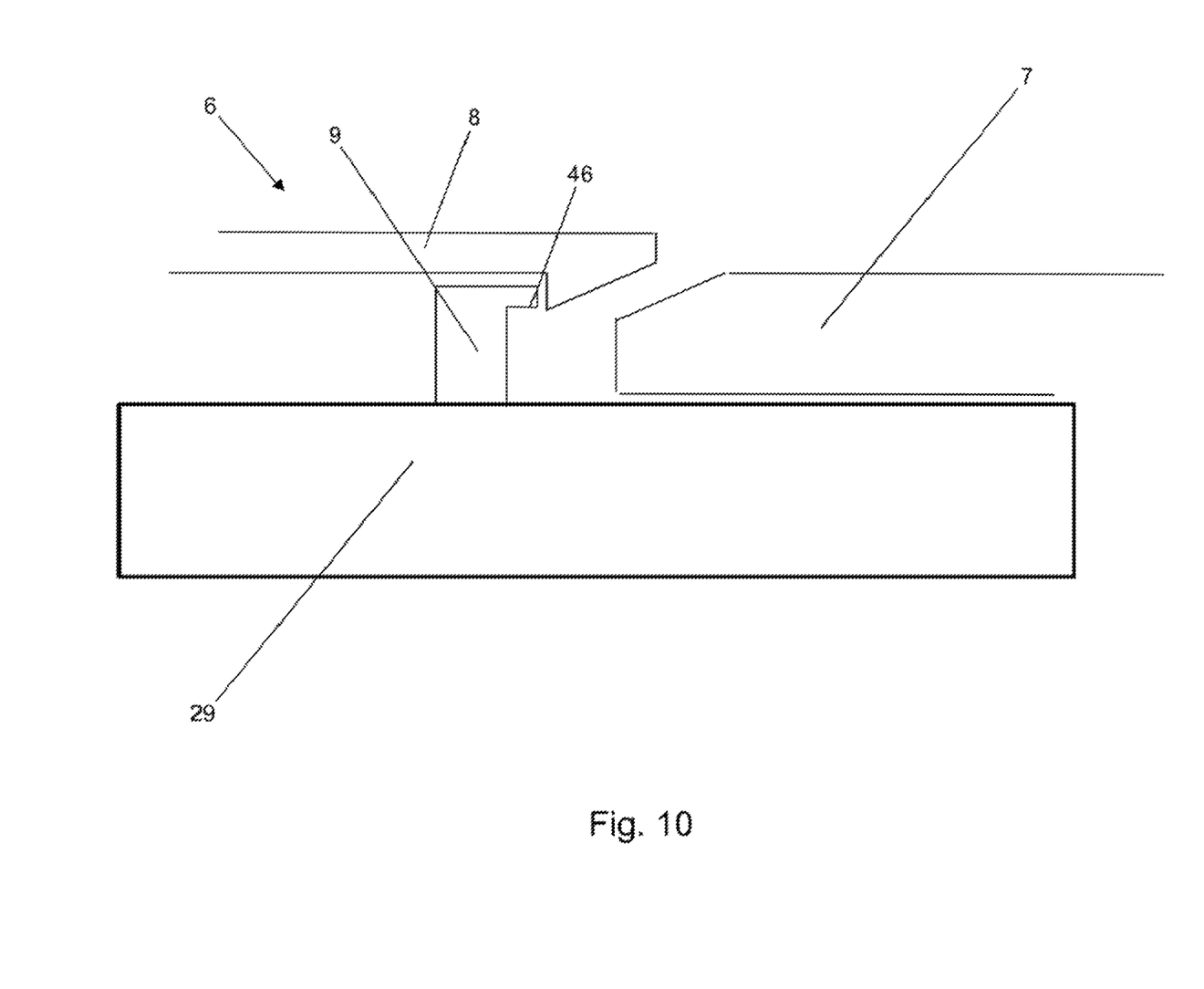
FIG. 10 shows a diagrammatic detailed illustration of a holding mechanism.

In the present exemplary embodiment, the holding mechanism 6 comprises a ring 28 with four latching elements 8 which are spaced apart uniformly along its circumference and are configured axially in the direction of the electromagnetic actuator 11, the ring 28 being arranged fixedly on the selector sleeve 2'. Furthermore, the holding mechanism 6 comprises a circumferential latching contour 9 in the form of an annular collar. The latching contour 9 is arranged along the circumference of an intermediate element 29, the intermediate element 29 being arranged fixedly on the first shaft element 3 (FIG. 5; FIG. 10).

The state which is shown in FIG. 1 corresponds to the first shifting position of the selector sleeve 2', in which first shifting position the first shaft element 3 and the second shaft element 4 are coupled fixedly via the "flyball" mechanism 30' so as to rotate together. Here, the selector sleeve 2' is pressed via a first elastic element 23 into the first shifting position and in the process presses the spherical connecting elements 31 of the "flyball" mechanism 30' into corresponding connecting element receptacles 32, in order in this way to ensure the transmission of torque from the first shaft element 3 to the second shaft element 4, or vice versa. Here, the electromagnetic actuator 11 is currentless, and the pushing element 7 is pulled by a second elastic element 24 as far as contact with the shifting lever 12. The pin 21 of the locking mechanism 17 is situated in the first locking position, that is to say in the state in which it is situated completely in the receiving opening 18 (FIG. 7).

The shifting lever 12 is prestressed by way of the third elastic element 13 in the rotational axis 14 of the shifting lever 12, with the result that said shifting lever 12 would engage permanently into the shifting guide plate 15 on the outer circumferential face 16 of the selector sleeve 2'. In the first shifting position (shown in FIG. 1 and FIG. 2) of the selector sleeve 2', the shifting lever 12 is prevented by way of the pushing element 7 from engaging into the shifting guide plate 15 on the outer circumferential face 16 of the selector sleeve 2'.

Instead of the third elastic element 13 on the rotational axis 14 of the shifting lever 12, a third elastic element between the shifting lever 12 and the housing 10 of the shifting mechanism 5 is also conceivable, which third elastic element would press the shifting lever 12 into the shifting guide plate 15 in exactly the same way.

Here, the second elastic element 24 is configured as a tension spring between the pushing element 7 and the housing 10. The configuration of a compression spring as a second elastic element 24 between the selector sleeve 2' and the electromagnetic actuator 11 would also be conceivable, however.

FIG. 2 diagrammatically shows the first shifting operation, namely a transition of the selector sleeve 2' from a first shifting position into a second shifting position. Upon energization of the electromagnetic actuator 11, more precisely of the coil 48 of the electromagnetic actuator 11, the pushing element 7 is moved in an axial direction toward the electromagnetic actuator 11 (to the right in relation to FIG. 2). The shifting lever 12 is released by way of said axial movement of the pushing element 7 and can therefore engage into the shifting guide plate 15 on the outer circumferential face 16 of the selector sleeve 2'. By way of a rotation of the first shaft element 3, the selector sleeve 2' is moved in the direction of the second shifting position (to the right in relation to FIG. 2) counter to the force of the first elastic element 23. As a result, the drive connection between the first shaft element 3 and the second shaft element 4 is released. The spherical connecting elements 31 of the "flyball" mechanism 30' are held radially on the outside by way of holding magnets 33 made from permanently magnetic material, in addition to the centrifugal force. The latching elements 8 of the holding mechanism 6 engage in each case into the circumferential latching contour 9 and thus prevent an undesired return of the selector sleeve 2' into the first shifting position.

Figure 8:
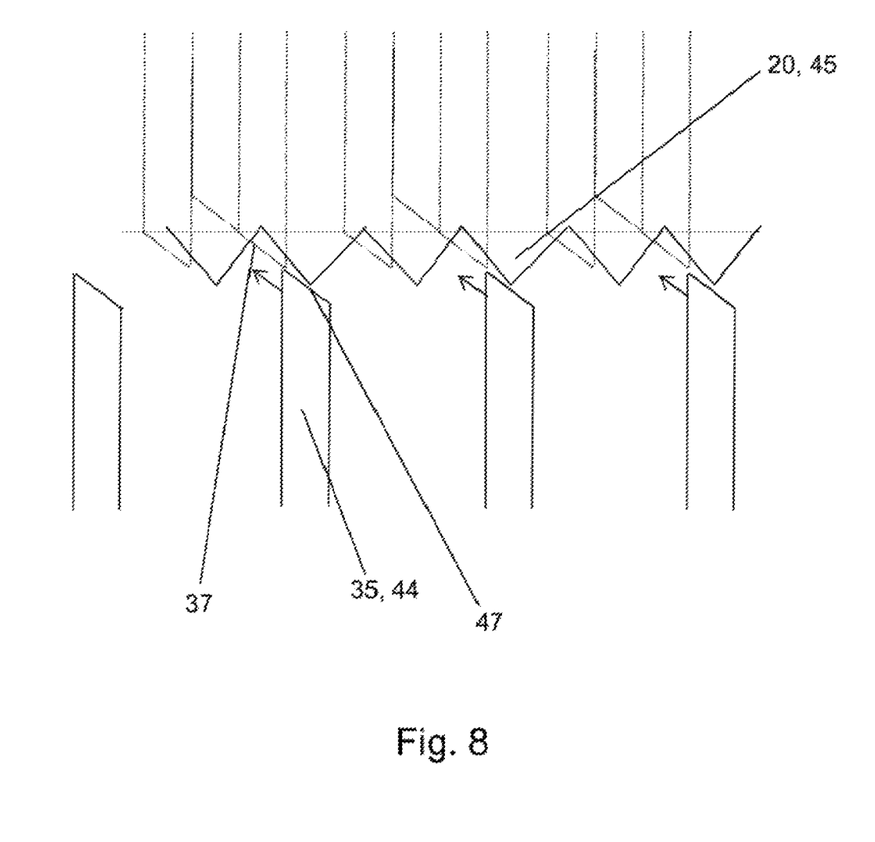

During the first shifting operation, furthermore, an actuation of the locking mechanism 17 occurs, since, in the case of the axial displacement of the pushing element 7 in the direction of the electromagnetic actuator 11, the pressure pin 19 of the locking mechanism 17 is pressed radially to the inside on account of the configuration of the housing 10, as a result of which the pin 21 extends through the second outlet opening 27 of the receiving opening 18 (FIG. 8).

Figure 9:
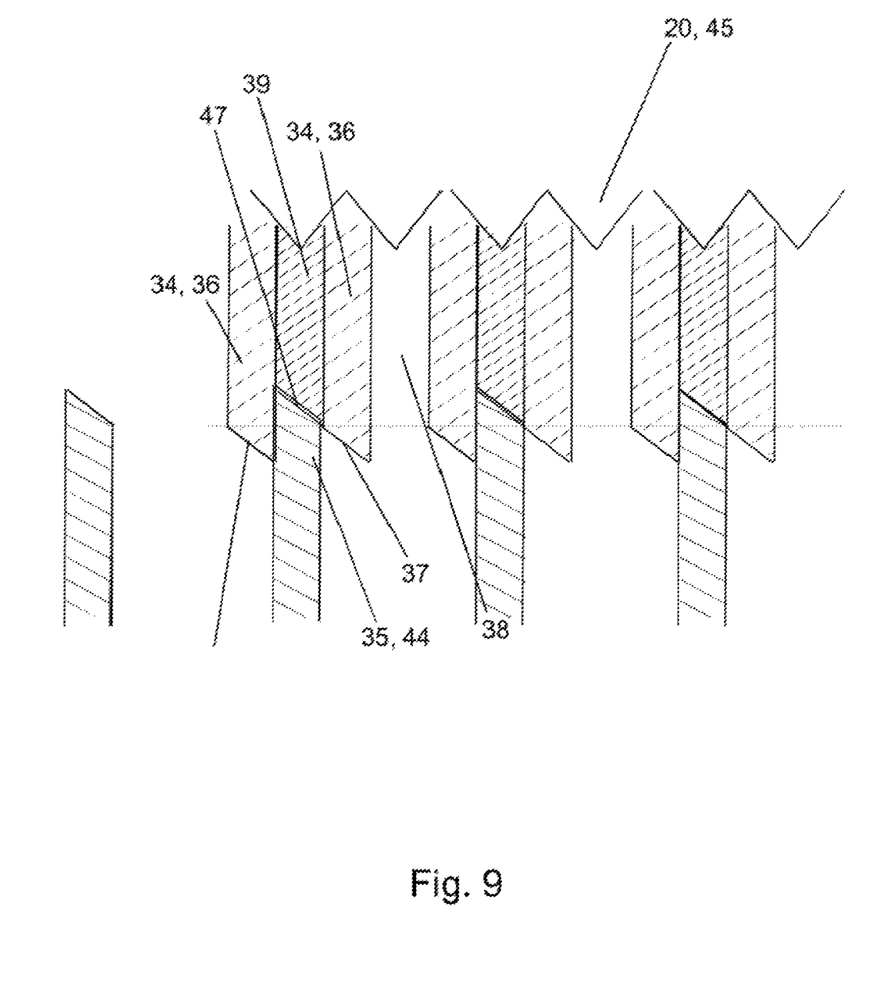

When the first shifting operation (shown diagrammatically in FIG. 2) is ended, the shifting lever 12 is lifted out of the shifting guide plate 15, by the electromagnetic actuator 11 being disconnected from the current; as a result, the pushing element 7 is moved axially to the left (in relation to FIG. 3) by the second elastic element 24. The locking mechanism 17 has been actuated by way of the first shifting operation in FIG. 2 as a result of the configuration of the housing 10, and the toothed segment 35 of the locking mechanism 17 rotates from an intermediate space 38 without a second elevation 39 into an intermediate space 38 with a second elevation 39 during the axial return movement of the pushing element 7. As a result, the pin 21 is situated in the second locking position and prevents the pushing element 7 from being displaced as far as contact with the shifting lever 12 by way of the force of the second elastic element 24. The shifting lever 12 comes into contact with the pin 21 of the locking mechanism 17, in order to not allow the shifting lever 12 to slide on the selector sleeve 2'. The latching element 8 of the holding mechanism 6 is latched in the latching contour 9 of the holding mechanism 6, in order to hold the selector sleeve 2' counter to the force of the first elastic element 23 (FIG. 3, FIG. 9).

In order to initiate the second shifting operation, namely the transfer of the selector sleeve 2' from the second shifting position into the first shifting position, the pushing element 7 is moved (in accordance with FIG. 2) axially in the direction of the electromagnetic actuator 11 (to the right in relation to FIG. 2) once again by way of energization of the electromagnetic actuator 11. The locking mechanism 17 is once again actuated in this way as a result of the configuration of the housing 10. Subsequently, the electromagnetic actuator 11 is again disconnected from the current, and the pushing element 7 is pulled axially to the left (in relation to FIG. 2) by way of the second elastic element 24. During the axial return movement of the pushing element 7, the toothed segment 35 rotates with the pin 21 of the locking mechanism 17 from an intermediate space 38 with a second elevation 39 into an intermediate space 38 without a second elevation 39. As a result, the pin 21 is situated in the first locking position, and the pushing element 7 can be displaced axially as far as contact with the shifting lever 12. The shifting lever 12 comes into contact with the pushing element 7. Here, the latching elements 8 of the holding mechanism 6 are released at the same time by way of the pushing element 7, by way of being lifted again out of the latching contour 9, and the selector sleeve 2' is pressed again into the first shifting position by way of the force of the first elastic element 23, as a result of which the spherical connecting elements 31 of the "flyball" mechanism 30' are pressed again into the corresponding connecting element receptacles 32, and a coupling of the first shaft element 3 and the second shaft element 4 is established (FIG. 4).

In the simplest case, the latching elements 8 of the holding mechanism 6 are configured as sheet metal components and can be elastically deformed by way of the pushing element 7 to such an extent that they are lifted from the latching contour 9 and the latching action between the latching elements 8 and the latching contour 9 is released as a result. The latching elements 8 rotate with the first shaft element 3, and all latching elements 8 are lifted at the same time by means of the rotationally symmetrical configuration of the pushing element 7. In order to facilitate the lifting of the latching elements 8 from the latching contour 9, an undercut 46 can also be provided on the latching contour (FIG. 4, FIG. 10).

The second shifting operation is possible even in the case of a stationary first shaft element 3.

On account of the configuration of the actuator arrangement 1, the selector sleeve 2' can be moved between two shifting positions in a highly dynamic manner with minimum use of electric auxiliary energy; electric auxiliary energy is required merely to control the shifting operations. The energy which is required for the movement of the selector sleeve 2' during the first shifting operation is taken from the rotating first shaft element. The energy which is required for the movement of the selector sleeve 2' during the second shifting operation is provided by way of relaxation of the first elastic element 23.

LIST OF DESIGNATIONS

1 Actuator arrangement
2 Shifting element
2' Selector sleeve
3 First shaft element
4 Second shaft element
5 Shifting mechanism
6 Holding mechanism
7 Pushing element
8 Latching element
9 Latching contour
10 Housing
11 Electromagnetic actuator
12 Shifting lever
13 Third elastic element
14 Rotational axis
15 Shifting guide plate
16 Outer circumferential face
17 Locking mechanism
18 Receiving opening
19 Pressure pin
20 Intermediate part
21 Pin
22 Compression spring
23 First elastic element
24 Second elastic element
25 Longitudinal axis
26 First outlet opening
27 Second outlet opening
28 Ring
29 Intermediate element
30 Positively locking coupling mechanism
30' "Flyball" mechanism
32 Connecting element
32 Connecting element receptacle
33 Holding magnet
34 Plug-in sleeve 35 Toothed segment
36 First elevation
37 First chamfer
38 Intermediate space
39 Second elevation
40 First stop
41 Second stop
42 First section
43 Second section
44 Third elevation
45 Toothing system
46 Undercut
47 Second chamfer
48 Coil

What is claimed is:

1. An actuator arrangement for a drive train of a motor vehicle comprising:
   an axially movable shifting element, wherein the shifting element is moveable between a first shifting position and a second shifting position, a first shaft element and a second shaft element being drive-connected in the first shifting position of the shifting element, and the first shaft element and the second shaft element not being drive-connected in the second shifting position of the shifting element,
   a shifting mechanism, wherein the shifting mechanism is configured to actuate a first shifting operation of the shifting element, namely an axial movement of the shifting element from the first shifting position into the second shifting position, and wherein the shifting mechanism is further configured to actuate a second shifting operation of the shifting element, namely an axial movement of the shifting element from the second shifting position into the first shifting position, and
   a holding mechanism, the shifting element being held mechanically both in the first shifting position and in the second shifting position via the holding mechanism,
   the shifting mechanism having an axially displaceable pushing element, and the holding mechanism having at least one latching element which is arranged fixedly on the shifting element and a latching contour which is arranged fixedly on the first shaft element, the latching element latching into the latching contour in the second shifting position of the shifting element, and wherein the latching element is released from the latching contour by the pushing element upon actuation of the second shifting operation.

2. The actuator arrangement as claimed in claim 1, wherein the shifting mechanism has a housing and an electromagnetic actuator, the electromagnetic actuator being arranged fixedly on the housing, and wherein the pushing element is moved axially relative to the housing by the electromagnetic actuator.

3. The actuator arrangement of claim 2, wherein energization of the electromagnetic actuator causes axial movement of the pushing element toward the electromagnetic actuator.

4. The actuator arrangement of claim 2, wherein during the first shifting operation, the pushing element moves axially toward the electromagnetic actuator and the shifting element moves axially to the second shifting position, and a locking mechanism is actuated to an actuated state.

5. The actuator arrangement of claim 4, wherein after the first shifting operation, the shifting element remains in the second shifting position and the pushing element moves axially away from the electromagnetic actuator.

6. The actuator arrangement of claim 5, wherein a shifting lever is biased into contact with the shifting element to maintain the shifting element in the second shifting position.

7. The actuator arrangement of claim 6, wherein during the second shifting operation, the pushing element moves axially toward the electromagnetic actuator and the locking mechanism is actuated to a non-actuated state.

8. The actuator arrangement of claim 7, wherein after the locking mechanism is actuated to the non-actuated state, the pushing element moves axially away from the electromagnetic actuator again and into contact with the shifting lever.

9. The actuator arrangement of claim 8, wherein the pushing element releases the latching element from the latching contour and disengages the shifting lever from the shifting element after the pushing element moves into contact with the shifting lever.

10. The actuator arrangement of claim 9, wherein the shifting element returns to the first shifting position after the pushing element releases the latching elements and disengages the shifting lever.

11. The actuator arrangement as claimed in claim 1, wherein the shifting mechanism has a shifting lever, wherein the shifting lever is moved about a rotational axis by a third elastic element into engagement with a shifting guide plate which is configured on an outer circumferential face of the shifting element, and wherein the shifting lever is brought out of engagement with the shifting guide plate by the pushing element counter to the force of the third elastic element.

12. The actuator arrangement as claimed in claim 1, wherein the pushing element has a locking mechanism, the locking mechanism disposed in a cylindrical receiving opening of the pushing element and having a pressure pin, an intermediate part, a plug-in sleeve, a pin with a toothed segment, and a compression spring.

13. The actuator arrangement as claimed in claim 12, wherein the locking mechanism is actuated by the axial movement of the pushing element relative to a housing of the shifting mechanism.

14. The actuator arrangement of claim 12, wherein the plug-in sleeve includes a plurality of radially extending first elevations having first chamfers at the radially inner ends thereof, a plurality of intermediate spaces between the first elevations, and a plurality of second elevations disposed within ever other intermediate space to define partially closed intermediate spaces having the second elevations and open intermediate spaces without second elevations.

15. The actuator arrangement of claim 14, wherein the toothed segment of the pin includes third elevations, wherein the third elevations are received in the partially closed intermediate spaces and engage the second elevations in an actuated state of the locking mechanism, and the third elevations are received in the open intermediate spaces in a non-actuated state of the locking mechanism.

16. The actuator arrangement of claim 14, wherein the intermediate part includes a radially oriented toothing system, wherein the intermediate part engages the toothed segment to rotate the toothed segment and to reciprocate the pin between the actuated state and the non-actuated state of the locking mechanism, wherein in the actuated state the pin extends radially inward relative to the non-actuated state.

17. The actuator arrangement as claimed in claim 1, wherein the first shaft element and the second shaft element are drive connected in the first shifting position by a positively locking coupling mechanism.

18. The actuator arrangement as claimed in claim 17, wherein the positive locking coupling mechanism is a flyball mechanism having a plurality of spherical connecting elements, wherein, in the first shifting position, the shifting element presses the spherical connecting elements into corresponding connecting element receptacles.

19. The actuator arrangement of claim 1, wherein during the first shifting operation, the shifting element moves to the second shifting position counter to a force of a first elastic element.

20. The actuator arrangement of claim 19, wherein during the first shifting operation, a locking mechanism is actuated to an actuated state in which a pin extends radially inward within a receiving opening of the pushing element.

* * * * *